United States Patent
Hattori et al.

(10) Patent No.: US 10,720,799 B2
(45) Date of Patent: Jul. 21, 2020

(54) STATOR OF ROTARY ELECTRIC MACHINE

(71) Applicant: Toyota Jidosha Kabushiki Kaisha, Toyota-shi Aichi-ken (JP)

(72) Inventors: Hiroyuki Hattori, Okazaki (JP); Takeshi Tomonaga, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 150 days.

(21) Appl. No.: 15/238,142

(22) Filed: Aug. 16, 2016

(65) Prior Publication Data

US 2017/0054338 A1   Feb. 23, 2017

(30) Foreign Application Priority Data

Aug. 20, 2015   (JP) .................................. 2015-162715

(51) Int. Cl.
*H02K 1/14*   (2006.01)
*H02K 1/16*   (2006.01)

(52) U.S. Cl.
CPC ............. *H02K 1/146* (2013.01); *H02K 1/165* (2013.01)

(58) Field of Classification Search
CPC .......... H02K 1/146; H02K 1/16; H02K 1/165; H02K 1/148
USPC .... 310/216.091, 216.094, 216.095, 216.099, 310/216.101, 216.104, 216.105, 216.093, 310/216.103, 180
See application file for complete search history.

(56) References Cited

U.S. PATENT DOCUMENTS

| | | | | |
|---|---|---|---|---|
| 911,364 A * | 2/1909 | Balcome | ................ | H02K 1/146 310/216.104 |
| 1,031,316 A * | 7/1912 | Apple | .................... | H02K 1/146 310/216.048 |
| 2002/0074892 A1* | 6/2002 | Lindbery | ............... | H02K 1/165 310/216.004 |
| 2005/0140243 A1* | 6/2005 | Park | ........................ | H02K 1/12 310/216.067 |
| 2006/0071571 A1* | 4/2006 | Groening | ............... | H02K 1/146 310/214 |
| 2010/0117465 A1* | 5/2010 | Kamiya | ................. | H02K 1/148 310/51 |

(Continued)

FOREIGN PATENT DOCUMENTS

JP   36-006931 Y   8/1934
JP   51-128201 U   10/1976

(Continued)

OTHER PUBLICATIONS

Asano (JP 2003032921 A) English Translation.*

(Continued)

*Primary Examiner* — Tulsidas C Patel
*Assistant Examiner* — Robert E Mates
(74) *Attorney, Agent, or Firm* — Dinsmore & Shohl LLP (57) ABSTRACT

A stator is for a rotary electric machine. The stator includes a stator core includes a stator yoke having an annular shape, teeth being projected to an inner diameter side from the stator yoke, coils wound around the teeth, and a reinforcing member. The reinforcing member has a ring shape, and fixed to an axial end surface at a tip of each of the teeth. The tip is a portion on the inner diameter side of an arrangement range of the coil. The reinforcing member is a non-magnetic body.

6 Claims, 4 Drawing Sheets

(56) References Cited

U.S. PATENT DOCUMENTS

| | | | | |
|---|---|---|---|---|
| 2010/0295403 A1* | 11/2010 | Morita | ................ | H02K 1/146 |
| | | | | 310/156.78 |
| 2011/0101818 A1* | 5/2011 | Lokhandwalla | ....... | H02K 1/148 |
| | | | | 310/216.098 |
| 2015/0207366 A1* | 7/2015 | Burkhardt | ........... | B32B 37/1292 |
| | | | | 310/216.009 |
| 2016/0111922 A1 | 4/2016 | Hattori et al. | | |

FOREIGN PATENT DOCUMENTS

| | | | |
|---|---|---|---|
| JP | 09285044 A | * | 10/1997 |
| JP | H1051987 A | | 2/1998 |
| JP | 2002-078299 A | | 3/2002 |
| JP | 2003-032921 A | | 1/2003 |
| JP | 2003032921 A | * | 1/2003 |
| JP | 2009273227 A | * | 11/2009 |
| JP | 2010-115057 A | | 5/2010 |
| JP | 2011-239626 A | | 11/2011 |
| JP | 2016-082721 A | | 5/2016 |
| WO | WO-2011015388 A2 * | 2/2011 | ............. H02K 1/148 |

OTHER PUBLICATIONS

Kamoki (JP 2009273227 A) English Translation (Year: 2009).*
Murakami (JP 09285044 A) English Translation (Year: 1997).*
Stoermer (WO 2011015388 A2) English Translation (Year: 2011).*

* cited by examiner

STATOR OF ROTARY ELECTRIC MACHINE

CROSS-REFERENCE TO RELATED APPLICATIONS

This application claims priority to Japanese Patent Application No. 2015-162715 filed on Aug. 20, 2015, which is incorporated herein by reference in its entirety including the specification, drawings and abstract.

BACKGROUND

1. Technical Field

The present disclosure relates to a stator of a rotary electric machine.

2. Description of Related Art

Japanese Patent Application Publication No. 10-051987 (JP 10-051987 A) discloses a stator core in which a tongue piece section and the like are not provided on both sides of a tip of a tooth and in which a slot opening is enlarged. In this stator core, a coil that is shaped in advance can easily be inserted in a slot. It is further disclosed that, after the coil is inserted in the slot, another member for forming the tongue piece section of the tooth is attached to an end of the slot opening.

Japanese Patent Application Publication No. 2002-078299 (JP 2002-078299 A) discloses that, when the slot that is straight in a radial direction is used, a coil fixation tool is attached to the slot so as to prevent slippage of the coil. The coil fixation tool is provided on an inner diameter side of the stator core such that a window is fitted to the tooth.

As a technique that is related to the present disclosure, Japanese Patent Application Publication No. 2010-115057 (JP 2010-115057 A) discloses a stator core of a rotary electric machine in which chamfered sections are provided in both side surfaces at a tip of the tooth. It is further described that a rapid change in magnetic flux that flows into the tooth during rotation of a rotor is alleviated by the chamfered sections so as to suppress torque ripple.

The other member in JP 10-051987 A and the coil fixation tool in JP 2002-078299 A partially close the slot opening. Thus, a foreign object is possibly accumulated in the slot.

SUMMARY

It is desired to improve rigidity of the tooth without accumulating the foreign object, which can be a cause of degraded electrical insulation performance, in the slot, and thereby improve a vibration noise characteristic.

A stator of a rotary electric machine according to one of embodiments of the present disclosure is characterized by including: a stator core including: a stator yoke having an annular shape and teeth being projected to an inner diameter side from said stator yoke; coils wound around the teeth; and a reinforcing member having a ring shape, the reinforcing member being fixed to an axial end surface at a tip of each of the teeth, the tip being a portion of each of the teeth that is on the inner diameter side of an arrangement range of the coil, and the reinforcing member being a non-magnetic body.

According to the stator of the rotary electric machine with the above configuration, the reinforcing member is fixed to the axial end surface at the tip of each of the teeth that is on the inner diameter side of the arrangement range of the coil. Because the reinforcing member does not close an opening of a slot, rigidity of the teeth can be improved while accumulation of a foreign object in the slot is prevented. In the stator of the rotary electric machine according to the present disclosure, the rigidity of the teeth can be improved without accumulating the foreign object, which can be a cause of degraded electrical insulation performance, in the slot.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A detailed description will hereinafter be made on embodiments according to the present disclosure by using the drawings. A stator that is used for a rotary electric machine mounted in a vehicle will hereinafter be described; however, this is merely illustrative for explanation purposes. Thus, the stator can be used in applications other than vehicle installation. A coil that is formed by using and winding rectangular wire in a single layer will hereinafter be described as a coil; however, this is merely illustrative for explanation purposes. The coil may be formed by using wire other than the rectangular wire, such as round wire with a circular cross section or wire with an oval cross section. In addition, the coil may be formed in multilayers. As a winding method, concentrated winding or distributed winding may be adopted. It will be described below that reinforcing members are respectively provided on both of axial end surfaces of a tooth. However, the reinforcing member may be provided only on one of the axial end surfaces of the tooth.

Shapes, dimensions, the number of teeth, the number of magnetic poles, the number of turns, materials, and the like, which will be described below, are merely illustrative for explanation purposes and thus can appropriately be changed in accordance with a specification of the stator of the rotary electric machine. In the following description, similar elements are denoted by the same reference numeral in all of the drawings, and the description thereon will not be repeated.

Figure 1:
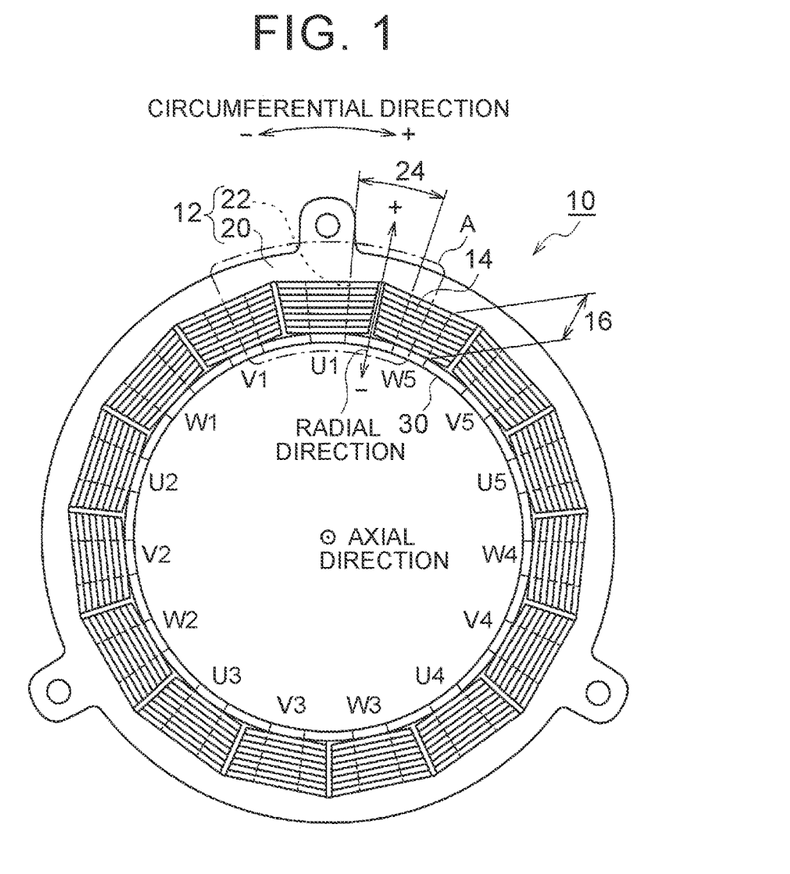
FIG. 1 is a top view of a stator of a rotary electric machine of an embodiment according to the present disclosure.

FIG. 1 is a view of a configuration of a stator 10 of a rotary electric machine that is used for the rotary electric machine mounted in the vehicle. Unless otherwise noted, the stator 10 of the rotary electric machine will hereinafter be referred to as a stator 10. The rotary electric machine, in which the stator 10 is used, is a motor generator that functions as a motor during power running of the vehicle and that also functions as a generator during braking of the vehicle through control of a drive circuit, and the rotary electric machine is also a three-phase synchronous rotary electric machine. The rotary electric machine is configured by including the stator 10 as a stator shown in FIG. 1 and a rotor as an annular rotor that is arranged on an inner circumferential side of the stator 10 with a specified clearance being provided therebetween. The rotor is not shown in FIG. 1.

FIG. 1 is a top view of the stator 10 that is seen from an axial direction. FIG. 1 shows a circumferential direction, a radial direction, and the axial direction of a stator core 12. A (+) direction of the circumferential direction is a clockwise direction in the top view of the stator 10, a (+) direction of the radial direction is a direction from an inner circumferential side toward an outer circumferential side of the stator core 12, and a (+) direction of the axial direction is a direction from a far side of the sheet of FIG. 1 toward a near side thereof. The same applies to the drawings below.

The stator 10 is configured by including the stator core 12, coils 14 that are attached to the stator core 12, and reinforcing members 30.

The stator core 12 is an annular magnetic part and includes an annular stator yoke 20 and plural teeth 22 that are projected from the stator yoke 20 to the inner circumferential side. A space between the adjacent teeth 22 is a slot 24. The tooth 22 is a projected section to which the coil 14 is attached and which thereby serves as a magnetic pole. From a perspective of winding of the coil 14, it is preferred that a tongue piece section is not provided at a tip of the tooth 22 and that the slot 24 is straight along the radial direction. In the following description, the tooth 22 does not have the tongue piece section, and the slot 24 is straight along the radial direction.

The stator core 12 mentioned above includes the stator yoke 20 and the teeth 22, is formed by stacking plural thin annular magnetic sheets 28 (see FIG. 2) that are molded in a specified shape such that the slots 24 are formed, and is used. Both surfaces of each of the thin magnetic sheets 28 are subjected to electrical insulation treatment. An electromagnetic steel sheet can be used as a material of the thin magnetic sheet 28. Instead of a stacked body of the thin magnetic sheets 28, magnetic powder may integrally be molded in the specified shape.

The coil 14 is a wire coil for which lead wire with an insulating film is used and which is formed by guiding the lead wire in the slot 24 and winding the lead wire around the tooth 22 for the specified number of turns by a specified winding method. The coil 14 is wound in a range that is up to a portion immediately before a foremost end of the tooth 22. FIG. 1 shows an arrangement range 16 of the coil 14. As the coil 14, an example of a concentrated winding coil that is wound in a single layer is shown in FIG. 1. However, this is merely illustrative. The coil 14 may be a concentrated winding coil that is wound in multilayers or may be a distributed winding coil. Unless otherwise noted, a description will hereinafter be made on the example of the concentrated winding coil.

As element wire of the lead wire with the insulating film for the coil 14, copper wire, copper-tin alloy wire, silver-plated copper-tin alloy wire, or the like can be used. As the element wire, rectangular wire having a substantially rectangular cross-sectional shape is used. As the insulating film, an enamel film of polyamide imide is used. Instead, polyester imide, polyimide, polyester, formal, or the like can be used.

Depending on a specification of the rotary electric machine, there is a case where an insulator is used to improve electrical insulation performance between the stator core 12 and the coil 14. The insulator is an insulation body that has a cylindrical shape and is held between an inner circumferential side surface of the coil 14 and an outer circumferential side surface of the stator core 12 that opposes the inner circumferential side surface of the coil 14. As the insulator, a sheet having an electrical insulation property can be used by being pressed into a specified shape. As the sheet having the electrical insulation property, in addition to paper, a plastic film can be used. It is considered that the electrical insulation performance of the insulating film of the lead wire that is used for the coil 14 is sufficiently high. Thus, the insulator will not be used in the following description.

One unit of the concentrated winding coil 14 is attached to each of the teeth 22 of the stator core 12. In the example of FIG. 1, five of the U-phase teeth 22, five of the V-phase teeth 22, and five of the W-phase teeth 22 are provided in the stator core 12, and one unit of the coil 14 is attached to each of these 15 units of the teeth 22. In FIG. 1, the teeth 22, to which the coils 14 are attached, are shown as U1 to U5 used for the U-phase, V1 to V5 used for the V-phase, and W1 to W5 used for the W-phase.

The coils 14 in the same phase are connected by jumper wire etc. which is not shown. For example, the coils 14 that are attached to the teeth U1 to U5 used for the U-phase are connected by the jumper wire and serve as one U-phase coil, and one end thereof is connected to a U terminal of a power line. The same applies to the coils 14 that are attached to the teeth V1 to V5 used for the V-phase and the coils 14 that are attached to the teeth W1 to W5 used for the W-phase. The coils 14 that are attached to the teeth V1 to V5 used for the V-phase are connected by juniper wire and serve as one V-phase coil, and one end thereof is connected to a V terminal of the power line, which is not shown. The coils 14 that are attached to the teeth W1 to W5 used for the W-phase are connected by jumper wire and serve as one W-phase coil, and one end thereof is connected to a W terminal of the power line, which is not shown. The other ends of the U-phase coil, the V-phase coil, and the W-phase coil are connected and serve as a neutral point.

The reinforcing member 30 is a member that is used to reinforce rigidity of the tooth 22. Each of the teeth 22 has such a structure that the stator yoke 20 side thereof is a supporting end and the tip side thereof is a free end. Accordingly, when the rigidity thereof is insufficient, vibrations are possibly generated due to mass of the tooth 22 itself, mass of the coil 14, or the like, and consequently noise is possibly generated. The reinforcing member 30 is a ring-shaped member. In each of the plural teeth 22, the reinforcing member 30 is fixed to an axial end surface at the tip thereof that is on an inner diameter side from the arrangement range 16 of the coil 14.

Figure 2:
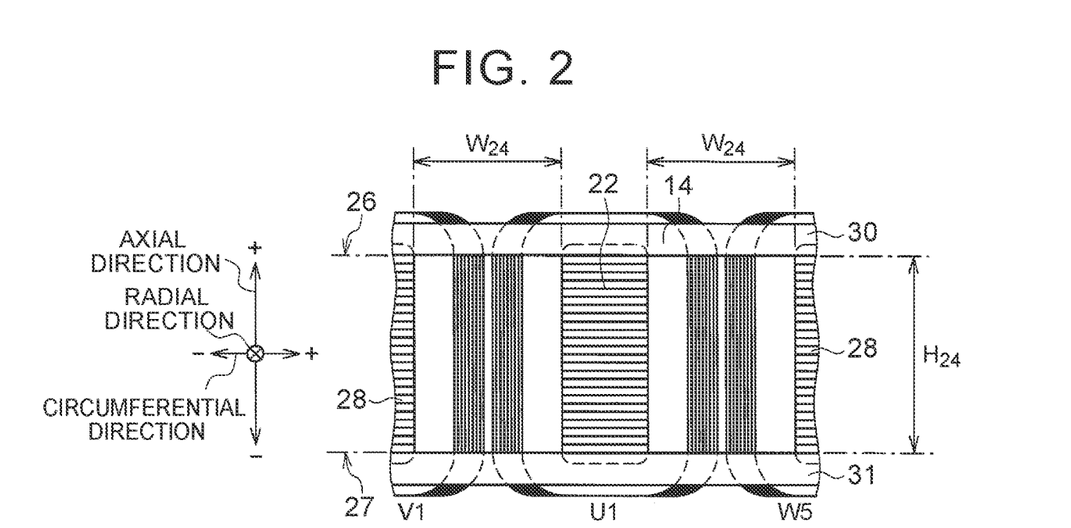
FIG. 2 is a development view in which a portion A in FIG. 1 is seen from an inner circumferential side of the stator of the rotary electric machine.

FIG. 2 is a development view in which a portion A in FIG. 1 is seen from the inner circumferential side of the stator 10. The portion A in FIG. 1 includes the three teeth 22 of U1, V1, and W5, the coils 14 that are wound around these teeth 22, and the reinforcing members 30, 31. In FIG. 2, as size of an opening of the slot 24 on the innermost circumferential side, an axial dimension of the opening is indicated as $H_{24}$, and a circumferential dimension of the opening is indicated as $W_4$.

As shown in FIG. 1, the reinforcing member 30 is disposed on the one side end in the (+) direction of the axial direction of the stator core 12. In contrast, while the reinforcing member 31 has the same shape and is formed of the same material as the reinforcing member 30, the reinforcing member 31 is disposed on the other side end in a (−)

direction of the axial direction of the stator core 12. As shown in FIG. 2, the reinforcing member 30 is fixed to an axial end surface 26 on one side at the tip of the tooth 22, and the reinforcing member 31 is fixed to an axial end surface 27 on the other side.

Each of such reinforcing members 30, 31 can be molded into a specified shape by using a non-magnetic material and can be used. A ceramic can be used as the non-magnetic material; however, a resin is preferably used from perspectives of a molding property, strength, and the like. As the resin, a material that has an electrical insulation property and also has appropriate strength and an appropriate heat resistance property is used. For example, a compound of an epoxy resin, a polyimide resin, an aromatic nylon resin, or the like is used. An appropriate filler may be contained in the resin.

As the specified shape, each of the reinforcing members 30, 31 is in an annular shape having concentric inner diameter and outer diameter and has uniform thickness. The inner diameter thereof is set to be equal to or larger than an inner diameter of the stator core that is defined by connecting the tips of the teeth 22 such that rotation of the rotor of the electric machine is not interfered and a specified rotary electric machine characteristic is exerted. Meanwhile, the outer diameter thereof is set to be equal to or smaller than an inner diameter of coil arrangement that is defined by connecting the arrangement ranges 16 of the coils 14 on the teeth 22. The thickness thereof is set such that the rigidity of each of the teeth 22 at a time when the reinforcing members 30, 31 are fixed to the tips of the plural teeth 22 is sufficiently high from a perspective of a vibration noise characteristic. Instead of the annular shape having the concentric inner diameter and outer diameter, each of the reinforcing members 30, 31 may have a polygonal annular shape, the number of vertices of which corresponds to the number of the teeth 22. Even in this case, each of the reinforcing members 30, 31 is set in such size that the polygonal annular shape is fitted within setting ranges of the above inner diameter and outer diameter.

In addition to adhesion and welding, a mechanical connecting means, such as screwing, can be used to respectively fix the reinforcing members 30, 31 to the axial end surfaces 26, 27 of the tooth 22. In the following description, an appropriate adhesive will be used as a fixing means. By this fixation, the reinforcing members 30, 31 can improve the rigidity of each of the teeth 22.

As shown in FIG. 2, the reinforcing members 30, 31 are arranged in the axial direction in such a manner as not to reduce the axial dimension $H_{24}$ of the opening of the slot 24 and are also arranged in the circumferential direction in such a manner as not to reduce the circumferential dimension $W_{24}$ of the opening of the slot 24. That is, because the reinforcing members 30, 31 do not close the opening of the slot 24, a foreign object is not accumulated in the slot 24, and degradation of the electrical insulation performance, which is caused by accumulation of the foreign object, is suppressed.

Figure 3:
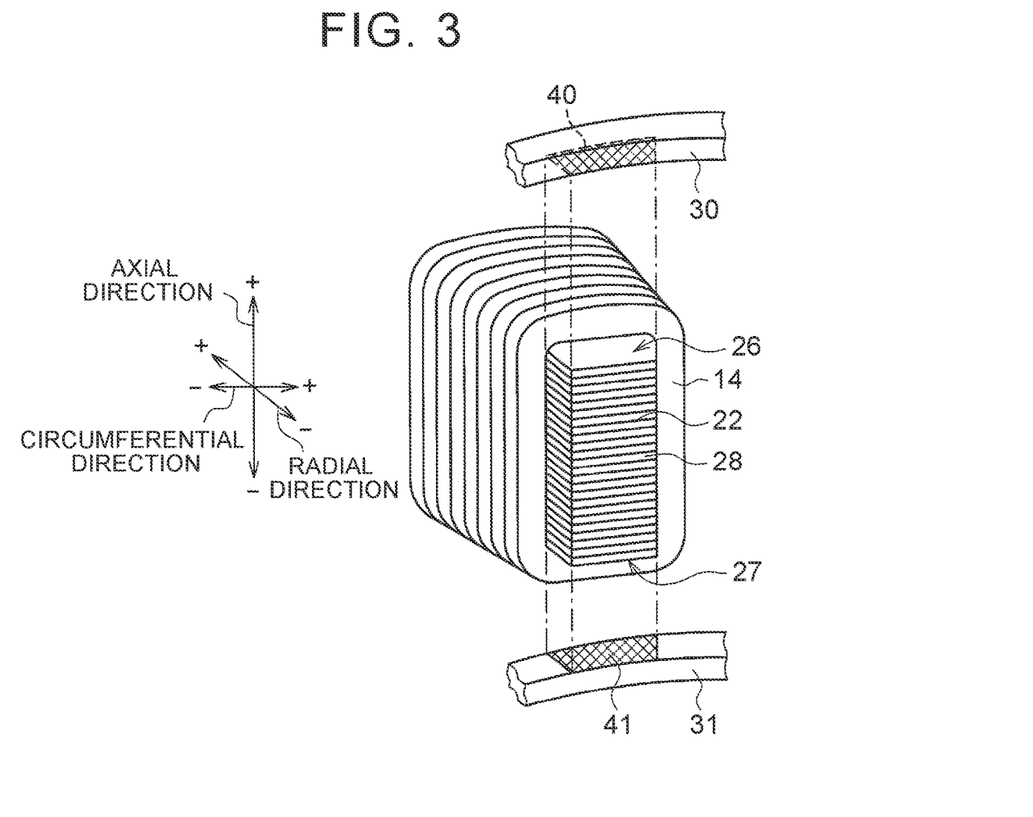
FIG. 3 is an exploded view that shows a relationship among a tooth, a coil, and a reinforcing member in regard to the one tooth in FIG. 2.

FIG. 3 is a perspective view in which a portion of U1 in FIG. 2 that is related to the tooth 22 is taken out, and is illustrated as an exploded view in which the reinforcing members 30, 31 are separated from the rest of the portion. When seen from a different perspective, FIG. 3 is a view of a state at a time point at which the stator core 12 has been assembled except for the reinforcing members 30, 31 and the reinforcing members 30, 31 are to be adhered to the axial end surfaces 26, 27 at the tip of the tooth 22.

In the reinforcing member 30, an adhesion region 40 in a surface on the (−) side of the axial direction of the stator 10 is adhered to the axial end surface 26 of the tooth 22 that is on the (+) direction side of the above axial direction. Similarly, an adhesion region 41 in a surface of the reinforcing member 31 that is on the above (+) direction side is adhered to the axial end surface 27 of the tooth 22 on the above (−) direction side. The reinforcing members 30, 31 are positioned such that the inner diameters of the reinforcing members 30, 31 are located at the same position as the inner diameter of the stator core that is defined by connecting the tips of the teeth 22 when the reinforcing members 30, 31 are arranged across all of the plural teeth 22. Alternatively, the reinforcing members 30, 31 are positioned such that the inner diameters of the reinforcing members 30, 31 are located on a radially outer side of the inner diameter of the stator core. In this way, the reinforcing members 30, 31 do not interfere with an operation of the rotor of the rotary electric machine.

In the above description, it is configured that only the adhesion regions 40, 41 of the reinforcing members 30, 31 are respectively fixed to the axial end surfaces 26, 27 at the tip of the tooth 22 by adhesion. In addition to this, an outer shape of the tooth 22 is partially dented to form recessed sections, and projected sections with the size corresponding to the recessed sections are provided in the reinforcing members 30, 31. Then, the projected sections of the reinforcing members 30, 31 are fitted to the recessed sections of the tooth 22. In this way, fixation strength is improved. Appropriate dents may be provided in the tooth 22 to form the recessed sections. However, in the case where the recessed sections as a dent are already provided in the tooth 22 for another purpose, those recessed sections are preferably used. As such a recessed section, a chamfered section and a notch for suppressing torque ripple of the rotary electric machine are available.

Figure 4:
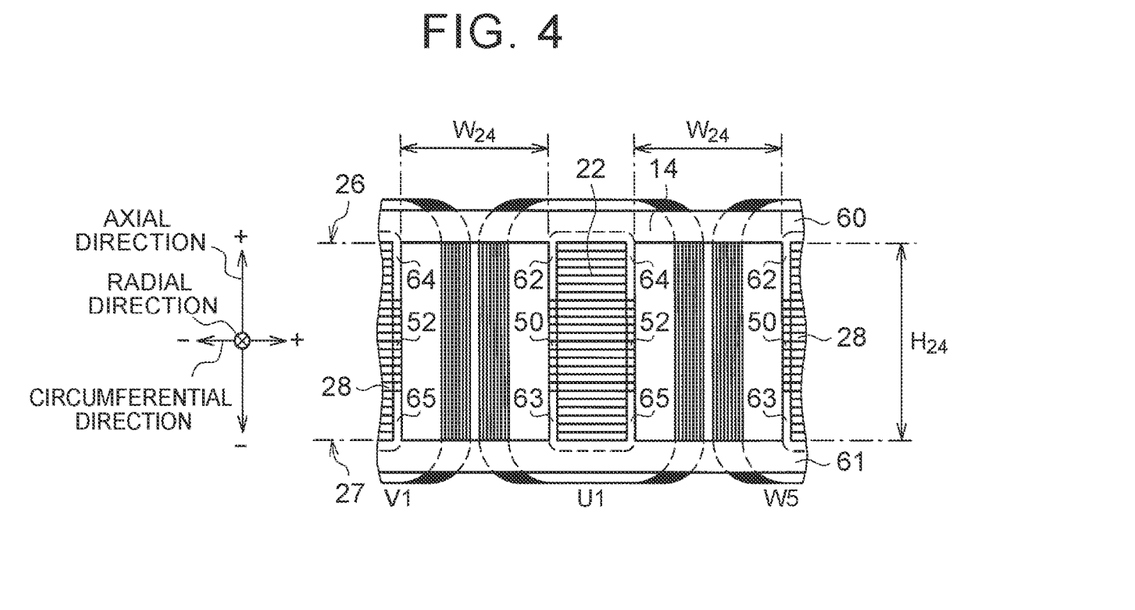
FIG. 4 is a view of another embodiment that corresponds to FIG. 2.
Figure 5:
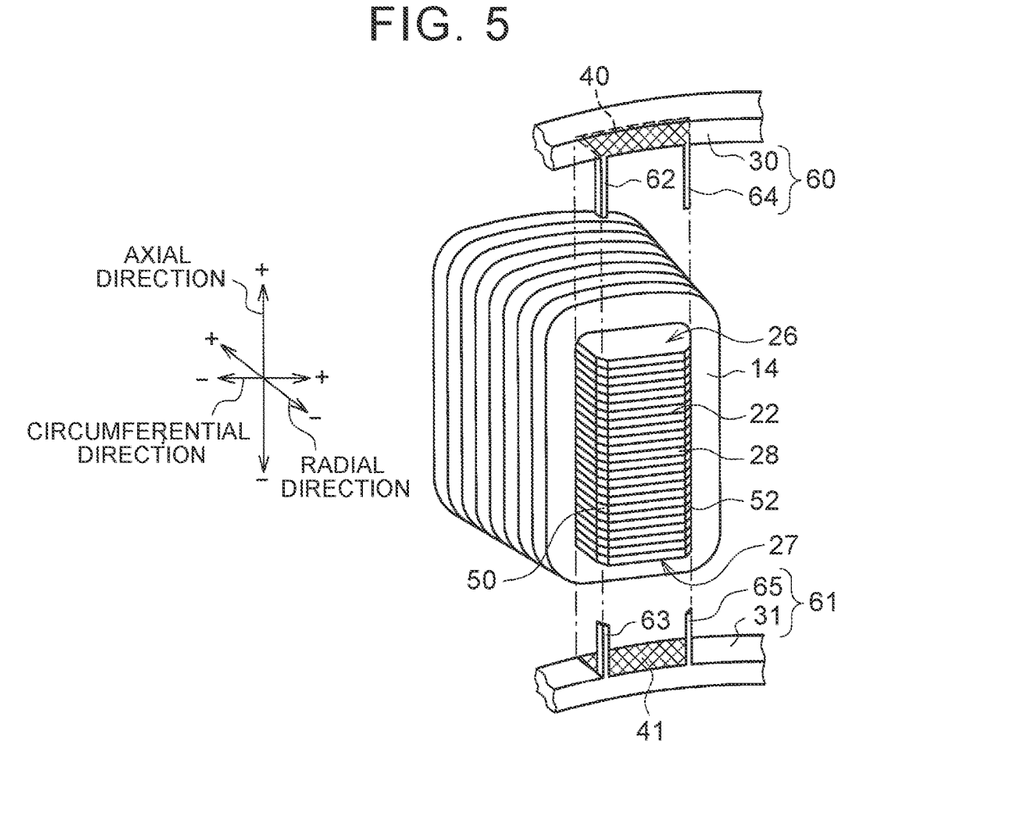
FIG. 5 is a view of another embodiment that corresponds to FIG. 3.

FIG. 4 and FIG. 5 are views of examples of reinforcing members 60, 61 whose adhesion strength is improved by using chamfered sections 50, 52 at circumferential ends of the tip of the tooth 22.

At the tip of the tooth 22, the chamfered section 50 is a recessed section of a dent that is provided in a total height range of the tooth 22 along the axial direction at an end in a (−) direction of the circumferential direction. Similarly, at the tip of the tooth 22, the chamfered section 52 is a recessed section of a dent that is provided in a total height range of the tooth 22 along the axial direction at the end in the (+) direction of the circumferential direction. The "height" of the tooth 22 means axial length of the tooth 22, and the "total height" means total length between both of the axial ends of the tooth 22.

In addition to a portion corresponding to the ring-shaped reinforcing member 30 described by using FIG. 2 and FIG. 3, the reinforcing member 60 has: a projected section 62 that is in a shape to fill the recessed section as the chamfered section 50; and a projected section 64 that is in a shape to fill the recessed section as the chamfered section 52. Corresponding to extension of the chamfered sections 50, 52 in the axial direction, the projected sections 62, 64 extend in the (−) direction of the axial direction from the portion corresponding to the ring-shaped reinforcing member 30.

Similarly, in addition to a portion corresponding to the ring-shaped reinforcing member 31 described by using FIG. 2 and FIG. 3, the reinforcing member 61 has: a projected section 63 with a shape to fill the recessed section as the chamfered section 50; and a projected section 65 with a shape to fill the recessed section as the chamfered section 52. Corresponding to the extension of the chamfered sections 50, 52 in the axial direction, the projected sections 63, 65 extend in the (+) direction of the axial direction from the portion corresponding to the ring-shaped reinforcing member 31.

The projected section 62 of the reinforcing member 60 and the projected section 63 of the reinforcing member 61 are fitted to the recessed section as the chamfered section 50 of the tooth 22 and fixed by the adhesive. It is set that a sum of the length of the projected section 62 and the length of the projected section 63 along the axial direction is shorter than the total height of the tooth 22 in the axial direction. It is set that, corresponding to a margin for the adhesive, each of outer shapes of the projected sections 62, 63 is slightly smaller in size than a shape of the recessed section as the chamfered section 50.

Similarly, the projected section 64 of the reinforcing member 60 and the projected section 65 of the reinforcing member 61 are fitted to the recessed section as the chamfered section 52 of the tooth 22 and fixed by the adhesive. It is set that a sum of the length of the projected section 64 and the length of the projected section 65 along the axial direction is shorter than the total height of the tooth 22 in the axial direction. It is set that, corresponding to a margin for the adhesive, each of outer shapes of the projected sections 64, 65 is slightly smaller in size than a shape of the recessed section as the chamfered section 52.

In addition to the adhesion regions 40, 41 described by using FIG. 3, the projected sections 62, 63, 64, 65 of the reinforcing members 60, 61 are adhered to the chamfered sections 50, 52. Thus, the fixation strength is improved.

In addition, even in the case where the projected sections 62, 63, 64, 65 are fitted to and fixed to the chamfered sections 50, 52 by the adhesive, an outer shape of the tooth 22 in this state does not become larger than an outer shape of the tooth 22 without the chamfered sections 50, 52 that has been described by using FIG. 2 and FIG. 3. Accordingly, even in the case where the projected sections 62, 64 of the reinforcing member 60 and the projected sections 63, 65 of the reinforcing member 61 are fitted to and fixed to the chamfered sections 50, 52 of the tooth 22, the axial dimension $H_{24}$ of the opening of the slot 24 is not reduced in the axial direction, and the circumferential dimension $W_{24}$ of the opening of the slot 24 is not reduced in the circumferential direction. That is, because the projected sections 62, 64 of the reinforcing member 60 and the projected sections 63, 65 of the reinforcing member 61 do not close the opening of the slot 24, the foreign object is not accumulated in the slot 24, and the degradation of the electrical insulation performance, which is caused by the accumulation of the foreign object, is suppressed.

Figure 6:
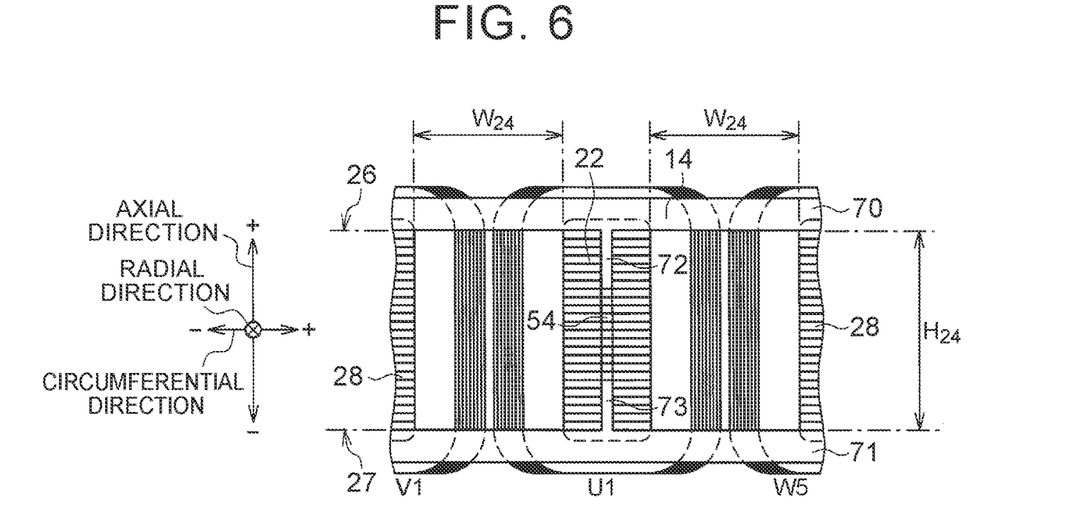
FIG. 6 is a view of yet another embodiment that corresponds to FIG. 2.
Figure 7:
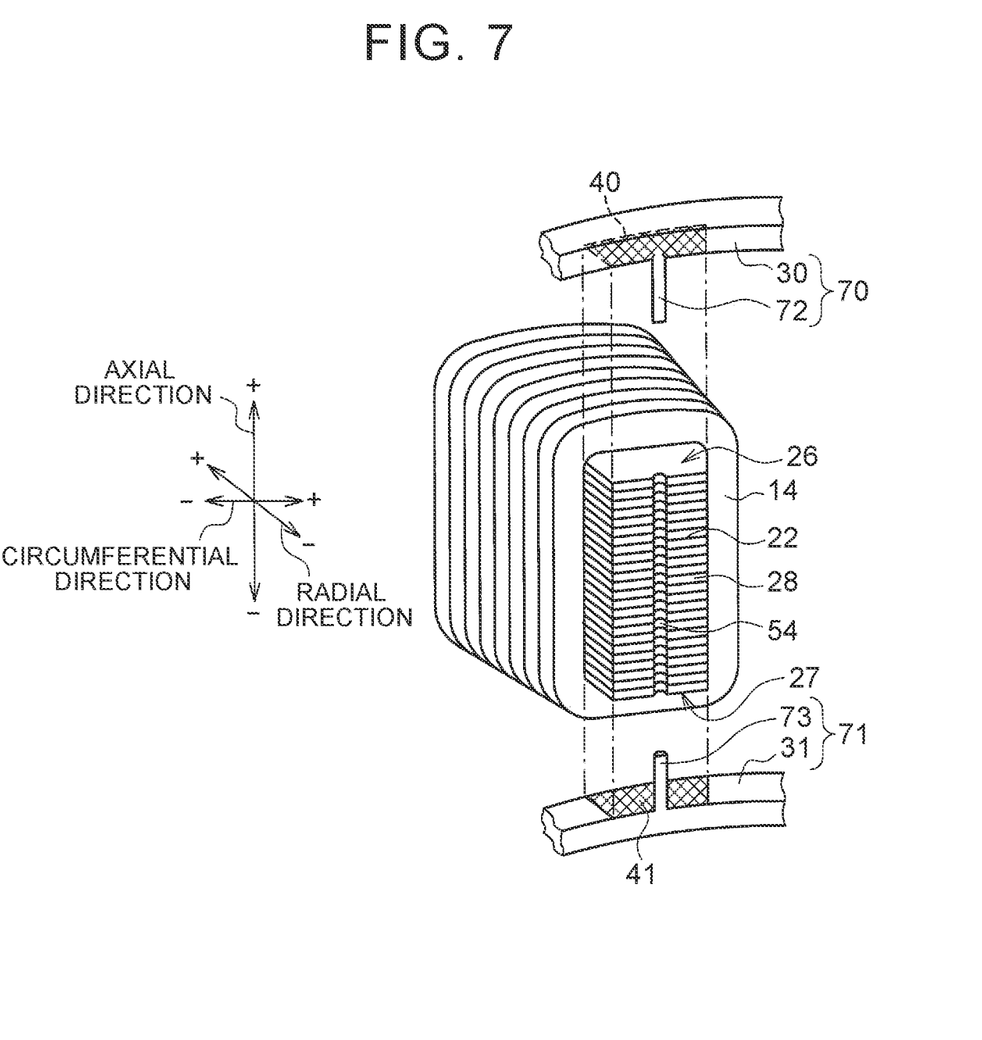
FIG. 7 is a view of yet another embodiment that corresponds to FIG. 3.

FIG. 6 and FIG. 7 are views of examples of reinforcing members 70, 71 whose adhesion strength is improved by using a notch section 54 in a radial end surface at the tip of the tooth 22.

In the radial end surface at the tip of the tooth 22, the notch section 54 is a recessed section of a dent that is provided in the total height range of the tooth 22 along the axial direction at a substantially central position along the circumferential direction.

In addition to the portion corresponding to the ring-shaped reinforcing member 30 described by using FIG. 2 and FIG. 3, the reinforcing member 70 has a projected section 72 that is in a shape to fill the recessed section as the notch section 54. Corresponding to extension of the notch section 54 in the axial direction, the projected section 72 extends in the (−) direction of the axial direction from the portion corresponding to the ring-shaped reinforcing member 30.

Similarly, in addition to the portion corresponding to the ring-shaped reinforcing member 31 described by using FIG. 2 and FIG. 3, the reinforcing member 71 has a projected section 73 that is in a shape to fill the recessed section as the notch section 54. Corresponding to the extension of the notch section 54 in the axial direction, the projected section 73 extends in the (+) direction of the axial direction from the portion corresponding to the ring-shaped reinforcing member 31.

The projected section 72 of the reinforcing member 70 and the projected section 73 of the reinforcing member 71 are fitted to the recessed section as the notch section 54 of the tooth 22 and fixed by the adhesive. It is set that a sum of the length of the projected section 72 and the length of the projected section 73 along the axial direction is shorter than the total height of the tooth 22 in the axial direction. It is set that, corresponding to the margin for the adhesive, each of outer shapes of the projected sections 72, 73 is slightly smaller in size than a shape of the recessed section as the notch section 54.

In addition to the adhesion regions 40, 41 described by using FIG. 3, the projected sections 72, 73 of the reinforcing members 70, 71 are adhered to the notch section 54. Thus, the fixation strength is improved.

In addition, even in the case where the projected sections 72, 73 are fitted to and fixed to the notch section 54 by the adhesive, an outer shape of the tooth 22 in this state does not become larger than the outer shape of the tooth 22 without the notch section 54 that has been described by using FIG. 2 and FIG. 3. Accordingly, even in the case where the projected section 72 of the reinforcing member 70 and the projected section 73 of the reinforcing member 71 are fitted to and fixed to the notch section 54 of the tooth 22, the projected sections 72, 73 are arranged while being held on an inner side of the inner diameter of the stator core that is defined by connecting the tips of the teeth 22. In this way, use of the reinforcing members 70, 71 does not interfere with the rotation of the rotor.

Furthermore, because the projected section 72 of the reinforcing member 70 and the projected section 73 of the reinforcing member 71 do not close the opening of the slot 24, the foreign object is not accumulated in the slot 24, and the degradation of the electrical insulation performance, which is caused by the accumulation of the foreign object, is suppressed.

In the stator of the rotary electric machine according to one of the embodiments of the present disclosure, the tooth may have the recessed sections in the axial end surface, each of the reinforcing members may have the projected sections corresponding to the recessed sections, and said projected sections may be fitted to and fixed to the recessed sections.

According to the stator of the rotary electric machine with the above configuration, the projected sections of the reinforcing members are fitted to the recessed section of the tooth. Thus, coupling between the reinforcing members and the tooth can further be intensified.

In the stator of the rotary electric machine according to another one of the embodiments of the present disclosure, the recessed sections may be the dents for suppressing the torque ripple of the rotary electric machine.

According to the stator of the rotary electric machine with the above configuration, the reinforcing members are fixed to the tooth by using the dents for suppressing the torque ripple of the rotary electric machine. Thus, the dents for fixation do not have to be specially provided.

In the stator of the rotary electric machine according to yet another one of the embodiments of the present disclosure, the recessed sections may be the chamfered sections at the circumferential ends of the end of the tooth, and the projected sections may be fitted to and fixed to the chamfered sections.

According to the stator of the rotary electric machine with the above configuration, because the projected sections of the reinforcing members are fitted to the chamfered sections at the tip of the tooth, the projected sections do not close the opening of the slot. Thus, coupling between the reinforcing members and the tooth can further be intensified.

In the stator of the rotary electric machine according to further another one of the embodiments of the present disclosure, the recessed section may be the notch section in the radial end surface at the tip of the tooth, and the projected sections may be fitted to and fixed to the notch section.

According to the stator of the rotary electric machine with the above configuration, because the projected sections of the reinforcing members are fitted to the notch section at the tip of the tooth, the projected sections do not close the opening of the slot or are not projected from the tip of the tooth. Thus, coupling between the reinforcing members and the tooth can further be intensified.

Here, this embodiment will be summarized. The stator 10 of the rotary electric machine includes: the stator core 12 that has the annular stator yoke 20 and the plural teeth 22 projected to the inner diameter side from the stator yoke 20; the coils 14 wound around the teeth 22; and the non-magnetic reinforcing member 30 that has the ring shape and is fixed to the axial end surface at the tip of each of the plural teeth 22 that is on the inner diameter side of the arrangement range 16 of the coil 14. Furthermore, the recessed sections provided at the tip of the tooth 22 may be used, and the reinforcing members that have the projected sections corresponding to the recessed sections may be used such that the projected sections are fitted to and fixed to the recessed sections.

What is claimed is:

1. A stator for a rotary electric machine, the stator comprising:
    a stator core including:
        a stator yoke having an annular shape, and
        teeth being projected to an inner diameter side from the stator yoke;
    coils wound around the teeth; and
    a reinforcing member having a ring shape that includes an inner diameter and an outer diameter concentric with the inner diameter, the reinforcing member being fixed to an axial end surface at a tip of each of the teeth, the tip being a portion on an inner diameter side of an arrangement range of the coils, and the reinforcing member being a non-magnetic body, the inner diameter is equal to or larger than an inner diameter of the stator core defined by connecting the tips of the teeth, and the outer diameter is equal to or smaller than an inner diameter of a coil arrangement defined by connecting the arrangement ranges of the coils,
    wherein each of the teeth includes a first chamfered section and a second chamfered section at a circumferential end of the tip of each of the teeth,
    wherein the reinforcing member includes a plurality of pairs of first projected sections and second projected sections, each of the first projected sections correspond to the first chamfered section of each of the teeth and each of the second projected sections correspond to the second chamfered section of each of the teeth, each of the first projected sections are fitted to and fixed to the first chamfered section of a respective tooth such that each of the first projected sections only contacts the first chamfered section of the respective tooth, each of the second projected sections are fitted to and fixed to the second chamfered section of the respective tooth such that the second projected section only contacts the second chamfered section of the respective tooth,
    wherein each pair of first projected sections and second projected sections are spaced apart from each pair of first projected sections and second projected sections on an adjacent tooth.

2. The stator according to claim 1, wherein
    the first chamfered section is a dent configured to suppress torque ripple of the rotary electric machine.

3. The stator according to claim 1, wherein the first projected section is fixed to the first chamfered section by adhesive.

4. A stator for a rotary electric machine, the stator comprising:
    a stator core including:
        a stator yoke having an annular shape, and
        teeth being projected to an inner diameter side from the stator yoke;
    coils wound around the teeth; and
    a reinforcing member having a ring shape, the reinforcing member being fixed to an axial end surface at a tip of each of the teeth, the tip being a portion on an inner diameter side of an arrangement range of the coils, and the reinforcing member being a non-magnetic body,
    wherein each of the teeth includes a first chamfered section and a second chamfered section at a circumferential end of the tip of each of the teeth,
    wherein the reinforcing member includes a plurality of pairs of first projected sections and second projected sections, each of the first projected section corresponds to the first chamfered section of each of the teeth and each of the second projected sections corresponds to the second chamfered section of each of the teeth, each of the first projected sections are fitted to and fixed to the first chamfered section of a respective tooth such that each of the first projected sections only contacts the first chamfered section of the respective tooth, each of the second projected sections are fitted to and fixed to the second chamfered section of the respective tooth such that each of the second projected sections only contacts the second chamfered section of the respective tooth,
    wherein each pair of first projected sections and second projected sections are spaced apart from each pair of first projected sections and second projected sections on an adjacent tooth, and
    wherein an outer shape of each of the projected sections is smaller in size than a shape of each of the chamfered sections.

5. The stator according to claim 4, wherein
    the first chamfered section is a dent configured to suppress torque ripple of the rotary electric machine.

6. The stator according to claim 4, wherein the first projected section is fixed to the first chamfered section by adhesive.

* * * * *

UNITED STATES PATENT AND TRADEMARK OFFICE
CERTIFICATE OF CORRECTION

PATENT NO. : 10,720,799 B2
APPLICATION NO. : 15/238142
DATED : July 21, 2020
INVENTOR(S) : Hiroyuki Hattori and Takeshi Tomonaga Page 1 of 1

It is certified that error appears in the above-identified patent and that said Letters Patent is hereby corrected as shown below:

On the Title Page

In Column 1, item (72), Inventor 1 Information, delete "Okazaki" and insert --Okazaki-shi Aichi-ken--, therefor.

In Column 1, item (72), Inventor 2 Information, delete "Toyota" and insert --Toyota-shi Aichi-ken--, therefor.

In Column 2, item (56), U.S. Patent Documents, Cite No. 6, delete "Kamiya" and insert --Kamiya et al.--, therefor.

In the Specification

In Column 4, Line(s) 32, delete "juniper" and insert --jumper--, therefor.

In Column 4, Line(s) 61, delete "$W_4$" and insert --$W_{24}$--, therefor.

In Column 5, Line(s) 67, after "(-)", insert --direction--, therefor.

Signed and Sealed this
Tenth Day of November, 2020

Andrei Iancu
*Director of the United States Patent and Trademark Office*